(12) United States Patent
Jordan et al.

(10) Patent No.: US 8,190,864 B1
(45) Date of Patent: May 29, 2012

(54) APIC IMPLEMENTATION FOR A HIGHLY-THREADED X86 PROCESSOR

(75) Inventors: Paul J. Jordan, Austin, TX (US); Gregory F. Grohoski, Bee Cave, TX (US)

(73) Assignee: Oracle America, Inc., Redwood City, CA (US)

( * ) Notice: Subject to any disclaimer, the term of this patent is extended or adjusted under 35 U.S.C. 154(b) by 748 days.

(21) Appl. No.: 11/924,491

(22) Filed: Oct. 25, 2007

(51) Int. Cl.
*G06F 9/00* (2006.01)

(52) U.S. Cl. ...................................................... 712/244
(58) Field of Classification Search .................... 712/244
See application file for complete search history.

(56) References Cited

U.S. PATENT DOCUMENTS

| | | | |
|---|---|---|---|
| 5,481,725 A * | 1/1996 | Jayakumar et al. | 710/48 |
| 5,495,615 A * | 2/1996 | Nizar et al. | 710/260 |
| 5,511,200 A * | 4/1996 | Jayakumar | 710/266 |
| 5,701,496 A * | 12/1997 | Nizar et al. | 710/266 |
| 5,987,538 A * | 11/1999 | Tavallaei et al. | 710/48 |
| 6,029,223 A | 2/2000 | Klein | 710/266 |
| 6,205,508 B1 * | 3/2001 | Bailey et al. | 710/260 |
| 6,339,808 B1 * | 1/2002 | Hewitt et al. | 710/260 |
| 6,370,606 B1 * | 4/2002 | Bonola | 710/260 |
| 6,438,622 B1 * | 8/2002 | Haghighi et al. | 710/1 |
| 6,470,408 B1 * | 10/2002 | Morrison et al. | 710/268 |
| 6,665,761 B1 * | 12/2003 | Svenkeson et al. | 710/268 |
| 6,687,818 B1 * | 2/2004 | Svenkeson et al. | 713/2 |
| 6,971,103 B2 * | 11/2005 | Hokenek et al. | 718/107 |
| 6,983,339 B1 * | 1/2006 | Rabe et al. | 710/260 |
| 7,620,955 B1 * | 11/2009 | Nelson | 719/312 |
| 7,627,706 B2 * | 12/2009 | Kaushik et al. | 710/268 |
| 2001/0052043 A1 * | 12/2001 | Pawlowski et al. | 710/260 |
| 2002/0103847 A1 * | 8/2002 | Potash | 709/107 |
| 2004/0073910 A1 * | 4/2004 | Hokenek et al. | 719/310 |
| 2004/0128563 A1 * | 7/2004 | Kaushik et al. | 713/300 |
| 2005/0125580 A1 * | 6/2005 | Madukkarumukumana et al. | 710/200 |
| 2005/0228918 A1 * | 10/2005 | Kriegel | 710/260 |
| 2006/0117316 A1 * | 6/2006 | Cismas et al. | 718/103 |
| 2006/0190945 A1 * | 8/2006 | Kissell | 718/108 |
| 2007/0067521 A1 * | 3/2007 | Shen et al. | 710/104 |
| 2007/0088888 A1 * | 4/2007 | Orita et al. | 710/260 |
| 2007/0106827 A1 * | 5/2007 | Boatright et al. | 710/263 |

(Continued)

OTHER PUBLICATIONS

The Importance of Implementing APIC-Based Interrupt Subsystems on Uniprocessor PC's, Microsoft Windows, updated Jan. 7, 2003, http://www.microsoft.com/whdc/system/sysperf/apic. mspx?pf=true, accessed Mar. 1, 2007, 6 pgs.

(Continued)

*Primary Examiner* — Idriss N Alrobaye
(74) *Attorney, Agent, or Firm* — Polsinelli Shughart PC

(57) ABSTRACT

Advanced programmable interrupt control for a multi-threaded multicore processor that supports software compatible with x86 processors. Embodiments provide interrupt control for increased threads with minimal additional hardware by including in each processor core, a core advanced interrupt controller (core APIC) configured to determine a lowest priority thread of its corresponding processor core. Each core APIC reports its lowest priority thread level as a core priority to an input/output APIC. The I/O APIC routes interrupt requests to the core APIC with the lowest core priority. The selected core APIC then routes the interrupt request to the corresponding lowest priority thread. Each core APIC detects changes in priority levels of its corresponding processor core threads, and notifies the I/O APIC of any change to the corresponding core priority. Each core APIC may notify the I/O APIC as the core priority changes, or when the I/O APIC requests status from each core APIC.

21 Claims, 5 Drawing Sheets

U.S. PATENT DOCUMENTS

2007/0204137 A1* 8/2007 Tran .............................. 712/214
2008/0028403 A1* 1/2008 Hoover et al. ................ 718/100

OTHER PUBLICATIONS

MultiProcessor Specification, Intel Corporation, Introduction and System Overview, Version 1.4, May 1997, 16 pgs.

Intel® 82093AA I/O Advanced Programmable Interrupt Controller (I/O APIC) Specification Update, Intel Corporation, Jan. 2001, 15 pgs.

82093AA I/O Advanced Programmable Interrupt Controller (IOAPIC), Preliminary, Intel Corporation, May 1996, 20 pgs.

* cited by examiner

APIC IMPLEMENTATION FOR A HIGHLY-THREADED X86 PROCESSOR

FIELD OF ART

The present invention is generally directed to interrupt control, and more particularly, but not exclusively, to advanced programmable interrupt control for a highly multi-threaded multicore processor that supports software that is compatible with x86 processors.

BACKGROUND

Early personal computer processors supported a very limited number of peripheral devices. Each peripheral device typically requested service from a computer processor by issuing interrupt requests to the computer processor. Interrupt requests are generally controlled by an interrupt controller (IC), which prioritizes the interrupt requests among the peripherals and application programs. Manufacturers regularly developed more advanced and more diverse peripheral devices and application programs that competed for use of the processor. In addition to using the new peripherals, consumers often desired that computer manufacturers also supported legacy peripheral devices. The increasing number of peripheral devices led to increased demands to process more numerous distinct interrupt requests. Some uniprocessor systems provided support for fewer interrupt requests than the number of peripherals requesting interrupts. These circumstances led to the creation of Advanced Programmable Interrupt Controller (APIC) architectures, such as the APIC architecture specified by Intel Corporation for x86 processors. A well known Intel APIC specification supports more interrupts for uniprocessor systems than prior interrupt controllers, and also provides support for multiprocessor and multithreaded systems.

For X86 multithreaded processors, the well known Intel APIC specification supports up to 255 threads, depending on a destination mode used to manage interrupts. A physical destination mode supports up to 255 threads (i.e., 255 destinations) using an 8-bit address. Alternatively, a logical destination mode is desirable, because it enables a hierarchical cluster destination model. The well known Intel APIC specification supports 60 threads for the hierarchical cluster destination model, using a 4-bit cluster ID and a 4-bit agent mask. The Logical Destination Register (LDR) and Interrupt Command Register (ICR) hold the fields that establish these limits. Some multithreaded processors, such as x86 processors, typically implement a small number (e.g., four) threads, so the existing APIC specification is adequate. However, it is desirable to create uniprocessors that support more than 60 threads for a hierarchical cluster destination model. The existing APIC specification would require a local APIC for each thread. This requires hardware on the processor for each thread. As the number of threads increases, the amount of hardware increases and consumes valuable area on the processor. This also increases interrupt latency as current APIC systems can determine the lowest priority thread so that it can route a new interrupt request to that thread. It is desirable to support more threads, yet minimize additional processor hardware and minimize interrupt latency, while still maintaining software compatibility that may specify thread numbers.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, processes, or devices. Accordingly, the present invention may take the form of an entirely hardware embodiment, an entirely software method embodiment, or an embodiment combining software and hardware aspects. Also, hardware may include digital hardware, analog hardware, and or combinations of digital and analog hardware. The following detailed description is, therefore, not to be taken in a limiting sense.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference. References in the singular are made merely for clarity of reading and include plural reference unless plural reference is specifically excluded. The meaning of either "in" or "on" includes both "in" and "on." The term "or" is an inclusive "or" operator, and is equivalent to the term "and/or" unless specifically indicated otherwise. The term "based on" or "based upon" is not exclusive and is equivalent to the term "based, at least in part on," and includes being based on additional factors, some of which are not described herein. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function or functions. The phrase "in one embodiment," as used herein does not necessarily refer to the same embodiment, although it may.

Briefly stated, the invention manages interrupt requests. Embodiments determine and maintain priority levels of multiple threads and schedule new interrupt requests for lowest priority threads.

Illustrative Operating Environment

Figure 1:
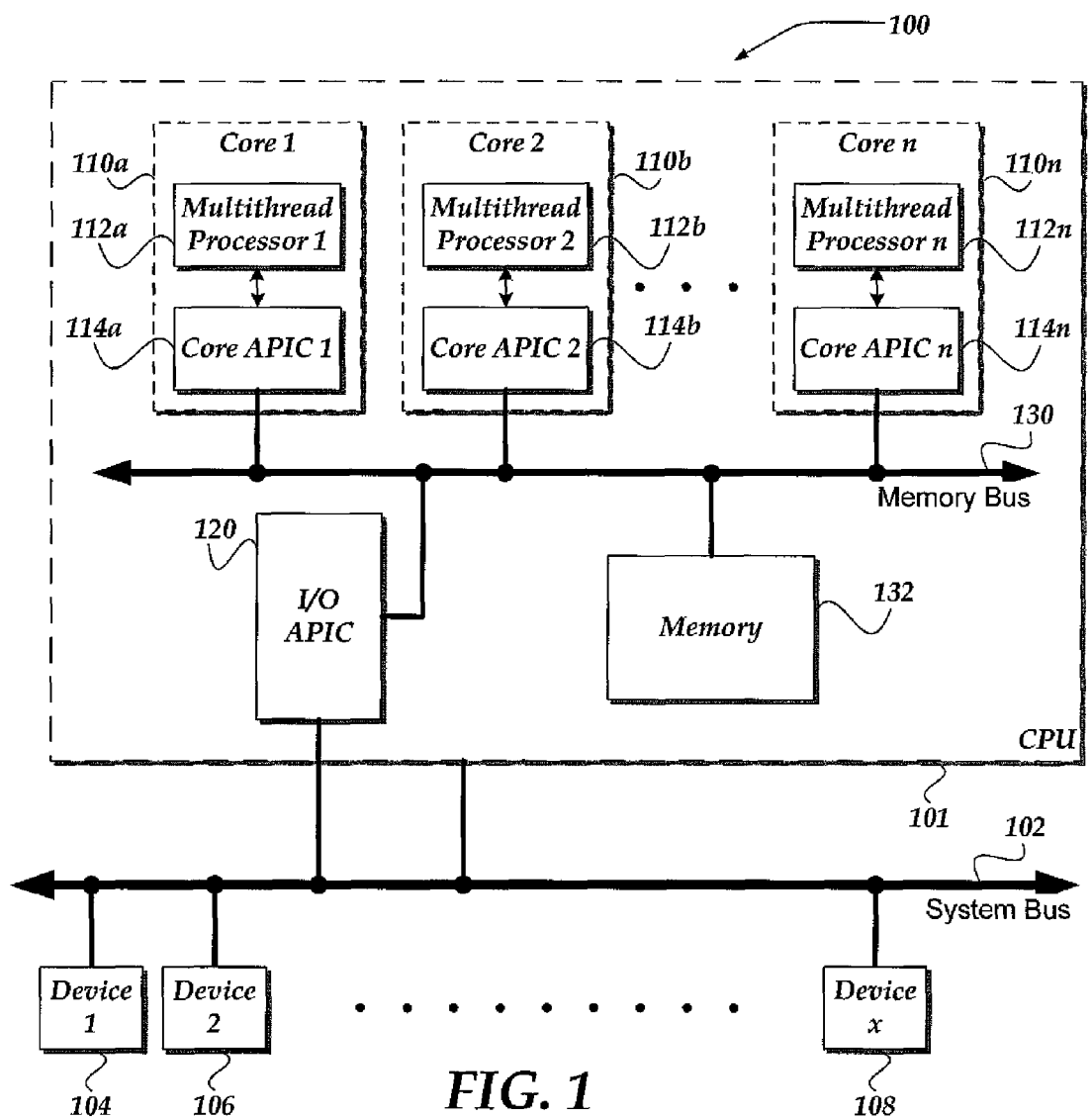
FIG. 1 shows a functional block diagram illustrating one embodiment of an environment for practicing the invention.

FIG. 1 shows components of one embodiment of an environment in which the invention may be practiced. Not all the components may be required to practice the invention, and variations in the arrangement and type of the components may be made without departing from the spirit or scope of the invention. This example embodiment illustrates computing system 100 with a multithreaded multicore central processing unit (CPU) 101 that is capable of multithreaded operation. A system bus 102 enables a number of internal and peripheral devices 104-108 to communicate with the CPU and its multiple processor cores 110a-110n. The peripheral devices may comprise storage devices, storage interface devices, memory devices, memory interface devices, input/output devices, input/output interface devices, network communication devices, network communication interface devices, display devices, display interface devices, graphic processing devices, audio devices, audio interface devices, audio processing devices, or the like. Each processor core includes a corresponding multithreaded processor as illustrated by multithreaded processors 112a-112n. Alternatively, each processor core may have multiple execution units. In one example embodiment, there may be 255 processor cores and each processor core can execute eight threads. That embodiment provides support for up to 2040 threads when using the hierarchical cluster destination model, which exceeds the number of threads supported by the existing APIC specification. Note that the definition of "core" can be implementation dependent so that any system structure of multiple threads could be supported. Note also that the division of cores among one CPU or multiple CPUs is implementation dependent.

Each processor core also includes a corresponding core APIC, as illustrated by core APICs 114a-114n. Each core APIC manages interrupt requests for the corresponding multiple threads for the corresponding processor core, rather than having an individual local APIC for each thread. Interrupt requests can be managed according to a hierarchical cluster destination model. Accordingly, the core APICs are managed by an input/output APIC, such as I/O APIC 120. The I/O APIC may be incorporated into the physical CPU or may be external to the physical CPU or CPUs. I/O APIC 120 receives external interrupt requests from peripheral devices and it receives interprocessor interrupts from core processors 110a-110n running multiple applications. The interrupt requests are routed via an internal bus, such as a memory bus 130. When using the lowest priority delivery mode, an interrupt request can be delivered to the core APIC that is considered the lowest priority core APIC, because its corresponding core processor is executing the thread with the lowest priority. Memory bus 130 is also coupled to a memory 132 for storing instructions and data, which may include the identity and priority level of each thread.

In a simplified system that provides only a single thread per core processor, each core APIC would be equivalent to a local APIC of current APIC architectures. The local APIC could provide the priority level of its corresponding thread to the I/O APIC, which can route new interrupt requests to the lowest priority thread. The priority of a thread is generally defined to be the larger of:

- a Task Priority Register, which is set by software and holds a threshold below which no interrupt will be taken; and
- an In-Service Register, which is set by hardware and holds the priority of the interrupts currently being serviced.

Since in this scheme the I/O APIC knows the priorities of all threads, the I/O APIC can select the thread with the lowest priority and can route the interrupt to that thread. This system behavior is highly desirable, but it is non-trivial to implement in hardware with multiple threads per core processor. If each thread has its own local APIC, then the communication between the local APICs and the I/O APIC grows very large. In addition, the task of finding the thread with the lowest priority becomes increasingly hard for the I/O APIC as threads are added.

However, embodiments of the invention use a hierarchical cluster destination model to support multiple threads per core processor, in part by using two modified registers in the core APICs to manage priority levels for each of multiple threads. Specifically, for each thread executed by a core processor, a corresponding core APIC includes a corresponding Interrupt Command Register (ICR) and a corresponding Logical Destination Register (LDR). Thus, each core APIC includes multiple ICRs and LDRs, rather than a single one of each register as is done for individual local APICs in current APIC architectures. Although these and other registers are still needed for each thread, duplicate processing hardware of individual local APICs is avoided by a core APIC.

Figure 2:
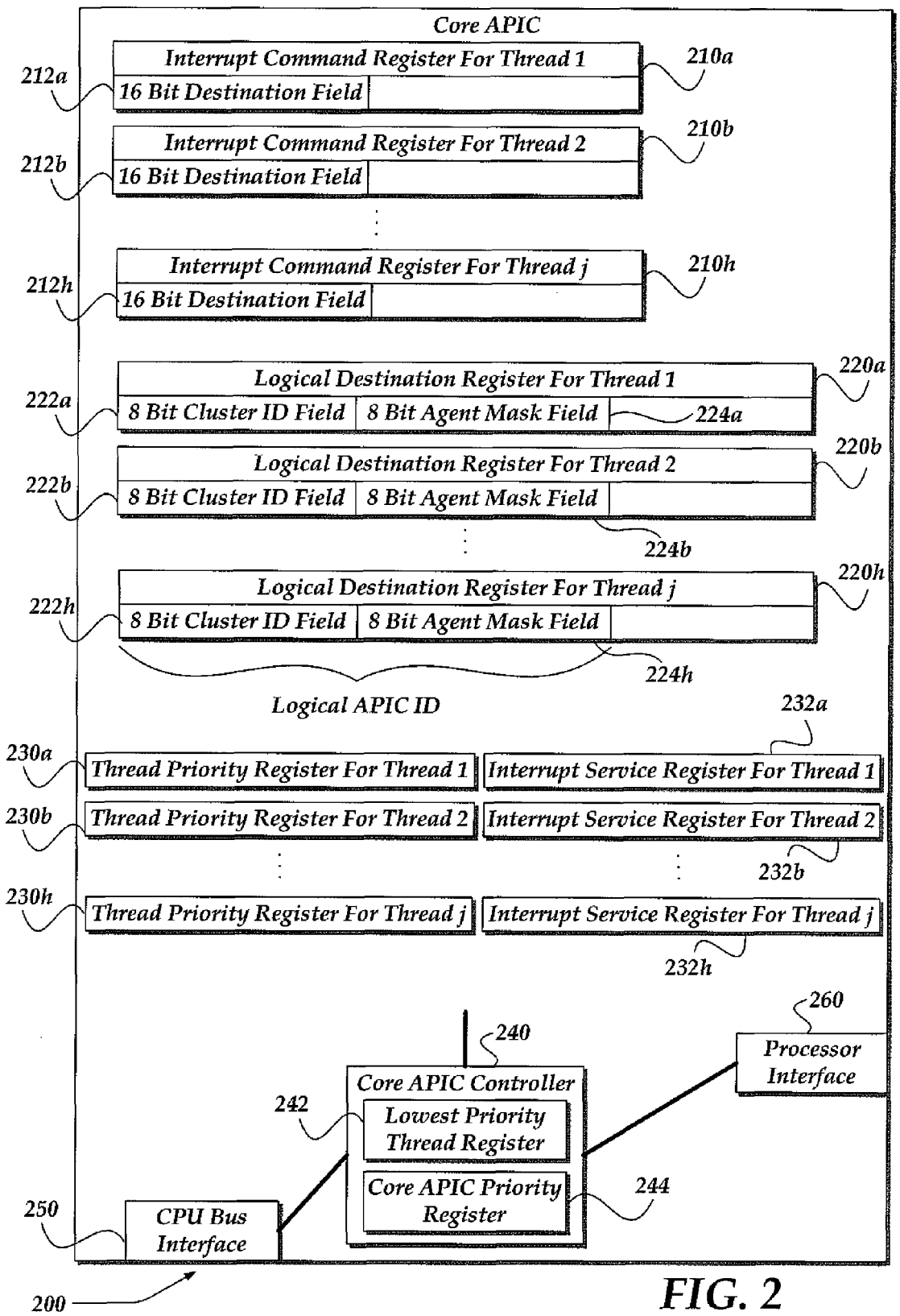
FIG. 2 is a block diagram of a core APIC according to aspects of the present invention.

FIG. 2 illustrates a sample embodiment of these registers and other components of an example core APIC 200. Those of ordinary skill in the art will recognize that not all components are necessarily shown, and some shown components may not be required. The core APIC 200 includes ICRs 210a-210h for h threads. In one embodiment, a core processor executes 8 threads, so there are 8 ICRs. Each ICR includes a 16-bit destination field, as illustrated by destination fields 212a-212h. In one embodiment, the destination field may be specified as bits 63-48 in a 64-bit ICR.

Similarly, core APIC 200 includes LDRs 220a-220h for h threads. Each LDR includes an 8-bit cluster identification field, as illustrated by cluster ID fields 222a-222h. Each LDR also includes an 8-bit agent mask field, as illustrated by agent mask fields 224a-224h. In one embodiment, the cluster ID field may be specified as bits 31-24 in a 32-bit LDR. The agent mask field may be specified as bits 23-16 in the LDR. By setting the cluster ID field and the agent mask field of the LDR to 8 bits each, the LDR supports 255 cores of 8 threads each, while still supporting a broadcast ID. For that embodiment, the ICR destination field is set to 16 bits. These settings enable managing interrupts for a larger number of threads.

Together, the cluster ID field and the agent mask field comprise a logical APIC identifier, so that each thread can be individually identified for interrupts using the hierarchical cluster destination model.

Core APIC 200 also includes thread priority registers (TPRs) 230a-230h for h threads. In addition, core APIC 200 includes interrupt service registers (ISRs) 232a-232h for h threads. Core APIC 200 may further include general purpose registers and/or other registers that are known to those of ordinary skill in the art.

Each core APIC stores the priority level of each thread and uses the priority level of the lowest priority thread as the priority level of the overall core APIC. Each core APIC provides its priority level to the I/O APIC, so that the I/O APIC can route a new interrupt request to the lowest priority core APIC, which can then route the new interrupt request to the lowest priority thread within that core.

The ICRs, LDRs, TPRs, and ISRs are in communication with a core APIC controller 240, which determines which thread to route interrupt requests to, and controls other operations of the core APIC. In one embodiment, core APIC controller 240 includes, or is coupled to a lowest priority thread register 242 that points to or stores an identity of the current lowest priority thread that is being executed by the corresponding multithreaded processor core. The core APIC controller can also use this register as a core APIC priority register to identify the lowest priority thread and/or store the lowest priority level as the lowest priority level of the core APIC. Alternatively, the core APIC controller may include, or be coupled to a separate core APIC priority register 244 to store the lowest priority level of the core APIC. In another embodiment, the core APIC controller may use a general memory location of the core processor or of the CPU to store and access the identity and priority level of the lowest priority thread.

Core APIC controller 240 is in communication with a CPU bus interface 250 for routing interrupt requests into the core APIC, for routing thread priority level status through the memory bus to the I/O APIC, and for other communications outside the core APIC, but internal to the CPU. The core APIC controller is also in communication with a processor interface 260, which interfaces with the multithreaded processor to determine priority levels of each thread, to route interrupt requests to the threads, and perform other communications with the multithreaded processor.

Figure 3:
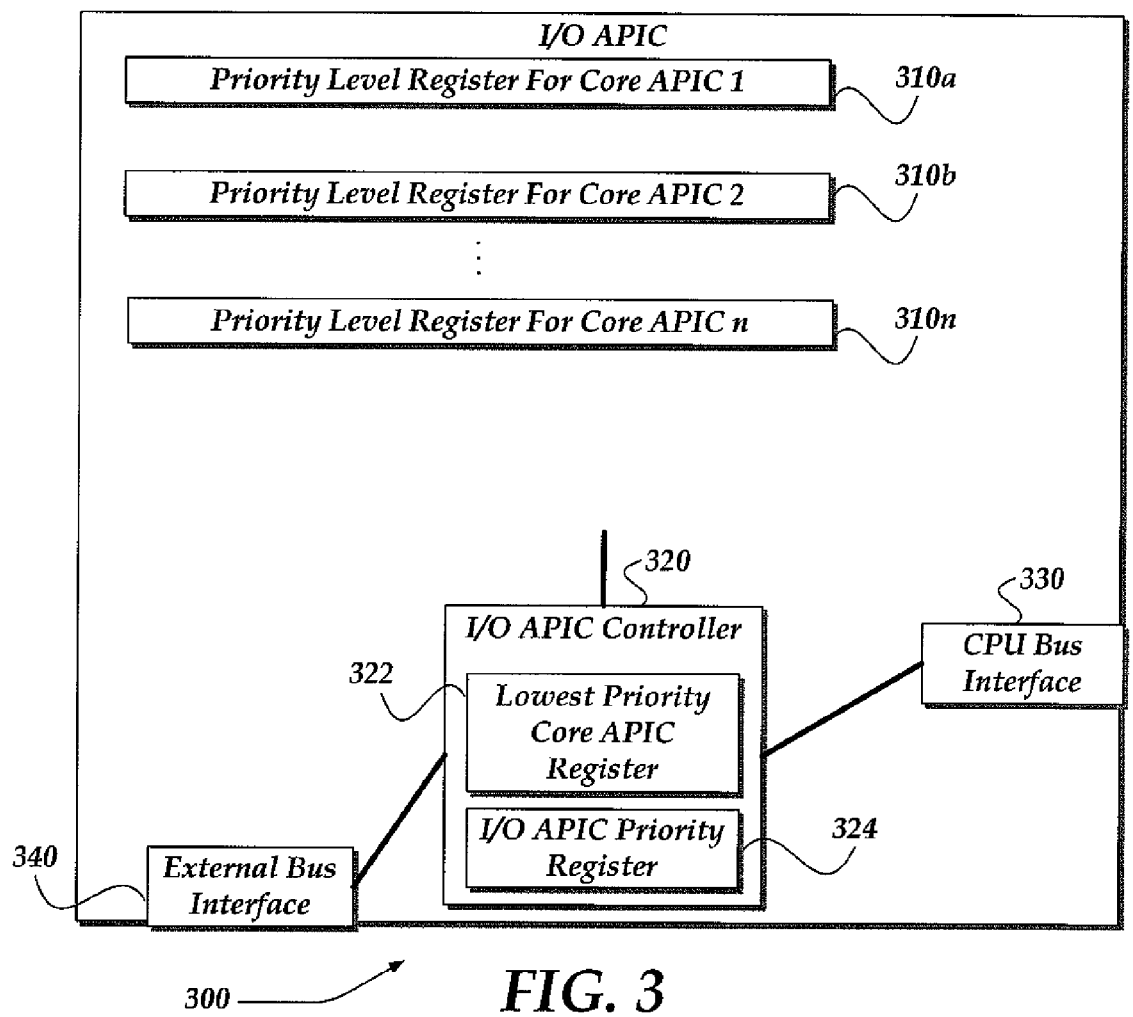
FIG. 3 is a block diagram of an input/output (I/O) APIC according to aspects of the present invention.

FIG. 3 is a block diagram of an I/O APIC according to aspects of the present invention. Those of ordinary skill in the art will recognize that not all components are necessarily shown, and some shown components may not be required. I/O APIC 300 includes core APIC priority level registers 310a-310n for n core APICs. I/O APIC 300 may further include general purpose registers and/or other registers that are known to those of ordinary skill in the art.

The registers are in communication with an I/OAPIC controller 320, which determines which core APIC to route interrupt requests, and controls other operations of the I/O APIC. In one embodiment, I/O APIC controller 320 includes, or is coupled to a lowest priority core APIC register 322 that points to or stores an identity of the current lowest priority core APIC corresponding to the core processor that is executing the lowest priority thread. The I/O APIC controller can also use this register as an I/O APIC priority register to identify the lowest priority thread and/or store the lowest priority thread level of the core APIC that corresponds to the lowest priority thread. Alternatively, the core APIC controller may include, or be coupled to a separate I/O APIC priority register 324 to store the lowest priority thread level of the core APIC that corresponds to the lowest priority thread. In another embodiment, I/O APIC controller may use a general memory location of the CPU to store and access the identity and priority level of the core APIC corresponding to the lowest priority thread.

I/O APIC controller 320 is in communication with a CPU bus interface 330 for routing interrupt requests into the core APICs, for receiving priority level status updates through the memory bus from the core APICs, and for other communications outside the I/O APIC, but internal to the CPU. The I/O APIC controller is also in communication with an external bus interface 340, which interfaces with devices external to the CPU, to receive interrupt requests from external devices, and to perform other communications with external devices.

Illustrative Processing

Figure 4:
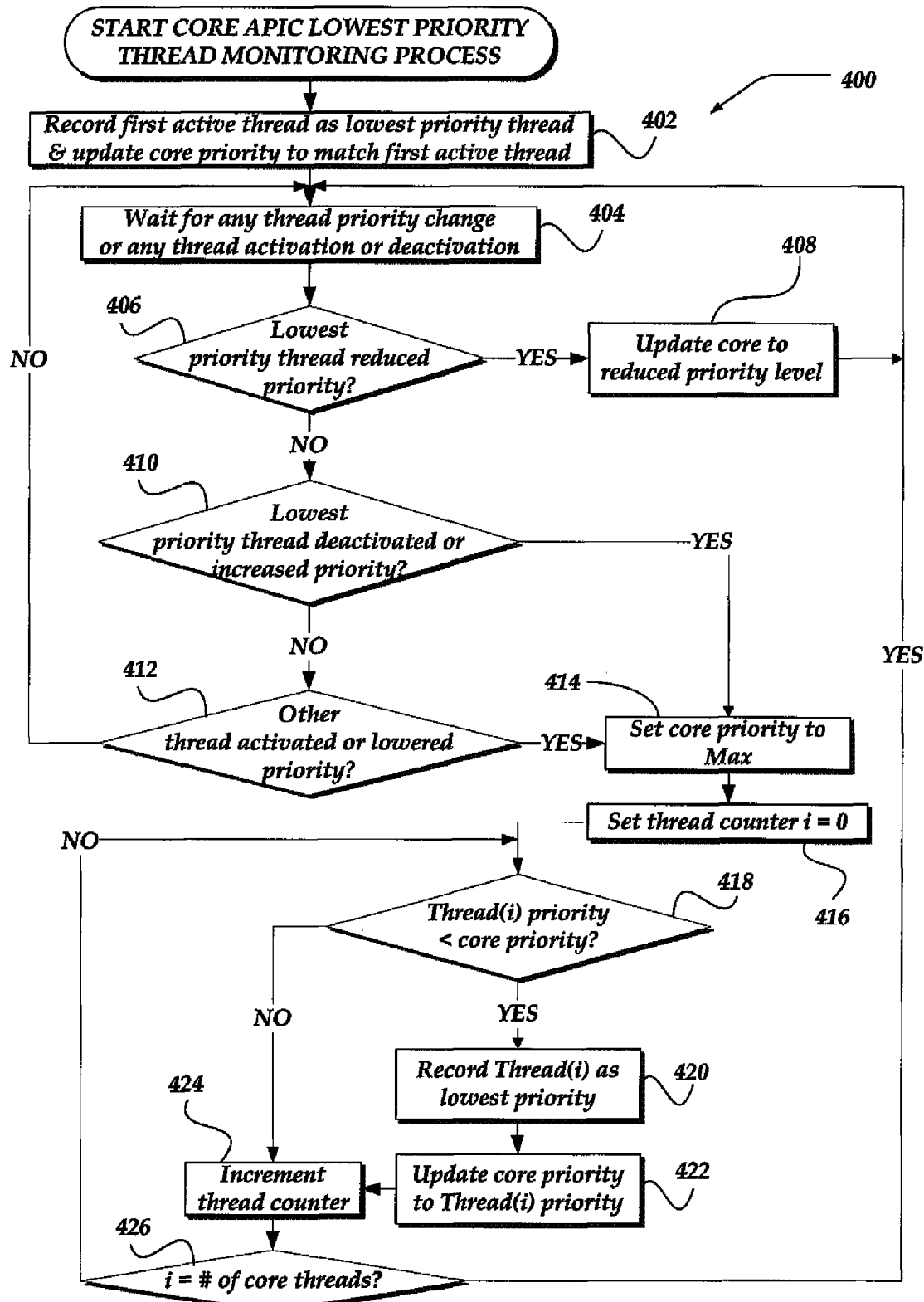
FIG. 4 illustrates a logical flow diagram generally showing one embodiment of a core APIC process for updating the priority level of threads executing on a processor core.

FIG. 4 illustrates a logical flow diagram generally showing one embodiment of a core APIC process 400 for monitoring the priority level of core processor threads, and updating the priority level of the core APIC based on a lowest priority thread, for use by the I/O APIC. At an operation 402, the core APIC detects a first executed thread and records this thread as the lowest priority thread of the core APIC. Accordingly, the core APIC updates the core APIC priority level to match the priority level of the first executed thread. At an operation 404, the core APIC waits to detect any change to priority level of any executing thread. The core APIC also waits to detect activation any new thread in the core processor, or deactivation of any previously executing thread in the core processor.

When one of the above events is detected, the core APIC evaluates the event at a decision operation 406 to determine whether the current lowest priority thread reduced its priority. For example, a new application program may have begun executing, causing the current lowest priority thread to reduce its priority even further. If the current lowest priority thread reduced its priority even further, the core APIC merely updates the core priority level to the reduced priority level, at an operation 408. Control then returns to operation 404 to wait for another event.

If the current lowest priority thread does not reduce its priority level, the core APIC determines, at a decision operation 410, whether the current lowest priority thread was deactivated, or has increased its priority level. In that case, the core APIC must determine a new lowest priority thread for that core processor, by evaluating each thread executing on that core processor. However, if the current lowest priority thread was not deactivated and has not increased its priority level, the core APIC determines, at a decision operation 412, whether another thread was activated or lowered its priority. If a currently higher priority thread increased its priority and no new threads were activated, the core APIC merely updates the priority level of the higher priority thread to the new higher priority level. Control then returns to operation 404 to wait for another event.

If a currently higher priority thread lowered its priority, a new thread was activated, the lowest priority thread increased its priority, or the lowest priority thread was deactivated, the core APIC evaluates each executing thread to determine a new lowest priority thread for that core processor. To prevent a new interrupt from being sent to the core APIC during this evaluation, the core APIC temporarily sets its core priority level to the maximum, at an operation 414. Alternatively, the core APIC may set its core priority level to a predefined code value, indicating to the I/O APIC that the core APIC is busy evaluating the priority levels of its threads. The core APIC also sets a thread counter to zero at an operation 416.

At a decision operation 418, the core APIC checks the priority level of a first one of the threads executing on the core processor. If the priority level of that first thread is lower than the maximum priority level set in operation 414, the core APIC records the identity of that first thread as the lowest priority thread, at an operation 420. The core APIC also sets the core priority level to the priority level of the first thread, at an operation 422. The core APIC then increments the thread counter at an operation 424. In the alternative, the thread counter is incremented if the priority level of that first thread is higher than the core priority level.

In any case, the core APIC checks the thread counter at a decision operation 426 to determine whether all of the threads have been evaluated. If more threads need to be evaluated, control returns to decision operation 418 to compare the priority level of the next thread against the current core priority. The core APIC then checks the priority level of the next thread executing on the core processor. If the priority level of that next thread is lower than the setting of the core priority level, the core APIC sets the core priority level to the priority level of that next thread. Similarly, the core APIC iterates through all of the threads executing on that core processor to determine the lowest priority thread. The process of cycling through the threads to reestablish a lowest priority thread may be a serial or parallel action. Once the new lowest priority thread is identified and stored, control returns to operation 404 to wait for another event related to thread priorities. Alternatively, if the core APIC detects a priority change in one of the threads before the iterative process is completed, the core APIC returns to operation 414 right away to restart the iterative process.

Figure 5:
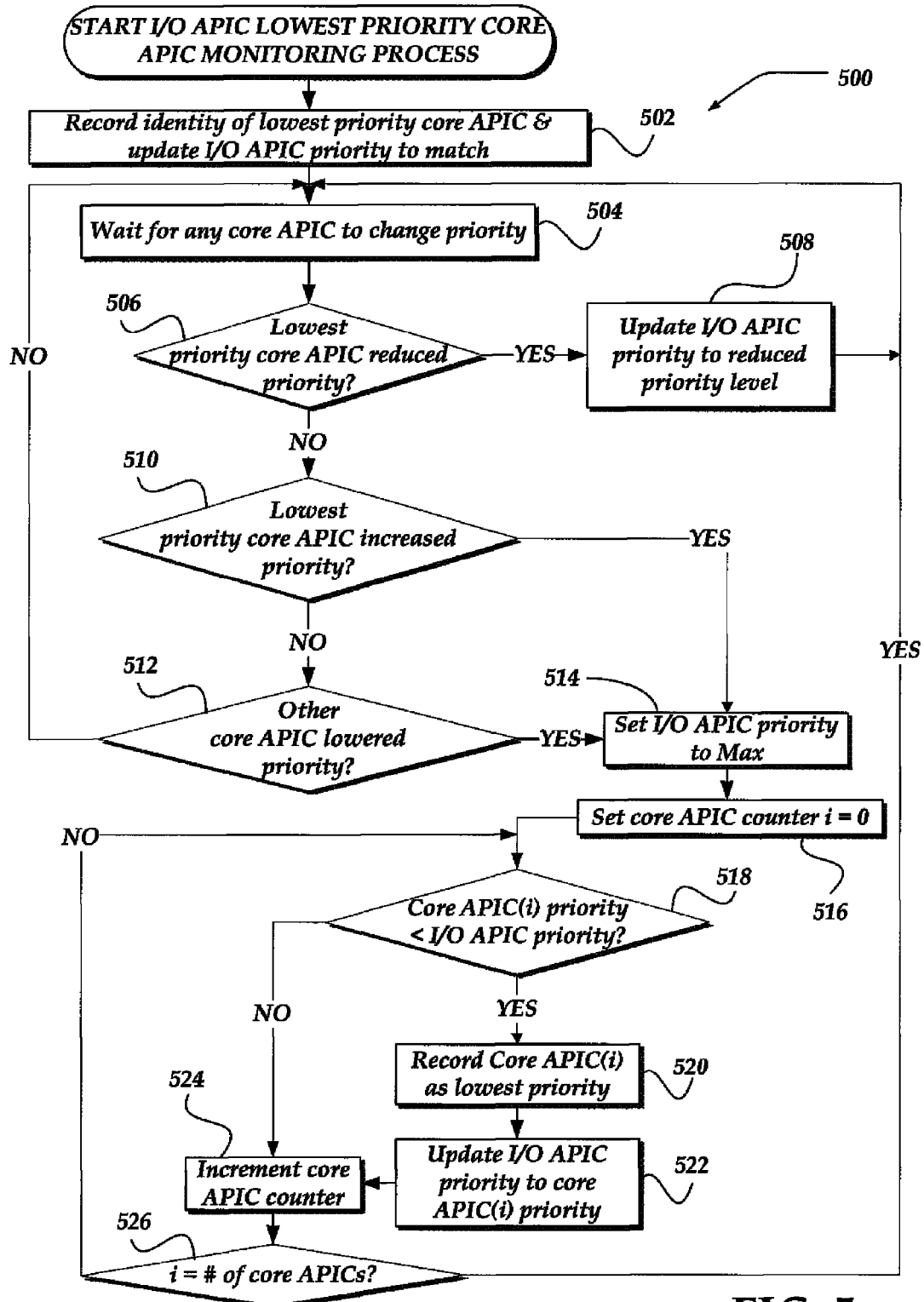
FIG. 5 illustrates a logical flow diagram generally showing one embodiment of an I/O APIC process for updating the priority level of core APICs managed by the I/O APIC.

FIG. 5 illustrates a logical flow diagram generally showing one embodiment of an I/O APIC process 500 for monitoring updating the priority level of core APICs managed by the I/O APIC. At an operation 502, the I/O APIC records the identity of the lowest priority core APIC. Accordingly, the I/O APIC updates the I/O APIC priority level to match the priority level of the lowest priority core APIC. At an operation 504, the I/O APIC waits to receive an indication of any change to the priority level of any core APIC.

When a core APIC changes priority level, the I/O APIC determines, at a decision operation 506, whether the current lowest priority core APIC reduced its priority. If the current lowest priority thread reduced its priority even further, the I/O APIC merely updates the I/O APIC priority level to the reduced priority level, at an operation 508. Control then returns to operation 504 to wait for another event.

If the current lowest priority core APIC does not reduce its priority level, the I/O APIC determines, at a decision operation 510, whether the current lowest priority core APIC has increased its priority level. In that case, the I/O APIC must determine a new lowest priority core APIC, by evaluating each core APIC. However, if the current lowest priority core APIC has not increased its priority level, the I/O APIC determines, at a decision operation 512, whether another core APIC lowered its priority. If a currently higher priority core APIC increased its priority, the I/O APIC merely updates the priority level of the higher priority core APIC to the new higher priority level. Control then returns to operation 504 to wait for another event.

If a currently higher priority core APIC lowered its priority or the lowest priority core APIC increased its priority, the I/O APIC evaluates the priority level of each core APIC to determine a new lowest priority core APIC. The I/O APIC sets its I/O APIC priority level to the maximum, at an operation 514. Alternatively, the I/O APIC may set its I/O APIC priority level to a predefined code value, indicating to the CPU that the core APIC is busy evaluating the priority levels of the core APICs. The I/O APIC also sets a core APIC counter to zero at an operation 516.

At a decision operation 518, the core APIC checks the priority level of a first one of the core APICs. If the priority level of that first core APIC is lower than the maximum priority level set in operation 514, the I/O APIC records the identity of that first core APIC as the lowest priority core APIC, at an operation 520. The I/O APIC also sets the I/O APIC priority level to the priority level of the first core APIC, at an operation 522. The I/O APIC then increments the core APIC counter at an operation 524. In the alternative, the core APIC counter is incremented if the priority level of that first core APIC is higher than the I/O APIC priority level.

In any case, the I/O APIC checks the core APIC counter at a decision operation 526 to determine whether all of the core APICs have been evaluated. If more core APICs need to be evaluated, control returns to decision operation 518 to compare the priority level of the next core APIC against the current I/O APIC priority level. The I/O APIC then checks the priority level of the next core APIC. If the priority level of that next core APIC is lower than the setting of the I/O APIC priority level, the I/O APIC sets the I/O APIC priority level to the priority level of that next core APIC. Similarly, the I/O APIC iterates through all of the core APICs to determine the lowest priority core APIC. The process of cycling through the core APICs to reestablish a lowest priority core APIC may be a serial or parallel action. Once the new lowest priority core APIC is identified and stored, control returns to operation 504 to wait for another event related to core APIC priorities. Alternatively, if the I/O APIC detects a priority change in one of the core APICs before the iterative process is completed, the I/O APIC returns to operation 514 right away to restart the iterative process.

In another embodiment, a hierarchy of I/O APICs are used to extend support of a lowest priority delivery mode as the number of threads grows.

In yet another embodiment, the core APICs maintain the core priority as described above, but do not report changes to the I/O APIC. When a new interrupt request is received in a lowest priority delivery mode, the I/O APIC sends a priority query to all core APICs. After all core APICs respond, or as each core APIC responds, the I/O APIC determines the core with the lowest priority. Once all core APICs have responded, the I/O APIC sends the interrupt request to the core APIC with the lowest priority. That selected core APIC forwards the interrupt request to the thread on that core processor with the lowest priority. This embodiment potentially reduces the number of messages sent between the core APICs and the I/O APIC, but it generally increases the latency to deliver an interrupt request. This scheme can also be extended by a hierarchy of I/O APICs.

The above specification, examples and data provide a description of the method and applications, and use of the invention. For example, another embodiment by eliminate the I/O APIC and each core APIC may communicate with each other to determine the lowest priority core APIC. Since many embodiments of the invention can be made without departing from the spirit and scope of the invention, this specification merely set forth some of the many possible embodiments for the invention.

What is claimed as new and desired to be protected by Letters Patent is:

1. A multithreaded multicore processor comprising:
an input/output advanced programmable interrupt controller (I/O APIC); and
a plurality of processor cores, each including:
one of a plurality of multithreaded processors configured to execute a plurality of threads; and
one of a plurality of core APICs, wherein each core APIC includes a plurality of interrupt command registers (IRCs), each of the plurality of IRCs corresponding to one of the threads of the plurality of threads of the multithreaded processor, a plurality of logical destination registers (LDRs), each of the plurality of LDRs corresponding one of the threads of the plurality of threads of the multithreaded processor, the one of a plurality of core APICs coupled to the one of the plurality of multithreaded processors and to the I/O APIC, and configured to receive an interrupt request and to route the interrupt request to a lowest priority thread of the one of the plurality of multithreaded processors.

2. The multithreaded multicore processor of claim 1, wherein each of the plurality of core APICs is configured to determine a core priority based on a thread priority level of each of the threads of the one of the plurality of multithreaded processors.

3. The multithreaded multicore processor of claim 1, wherein the I/O APIC includes a lowest priority core APIC register and an I/O APIC priority register, and is configured to:
receive a core priority from each of the plurality of core APICs;

determine a lowest priority core APIC of the plurality of core APICS, wherein the lowest priority core APIC has a lowest core priority corresponding to the lowest priority thread; and route the interrupt request to the lowest priority core APIC.

4. The multithreaded multicore processor of claim 1, wherein each core APIC includes:
a lowest priority thread register;
a core APIC priority register; and
a core APIC coupled to each of the plurality of ICRs, to each of the plurality of LDRs, to the lowest priority thread register, and to the core APIC priority register, wherein the core APIC controller routes the interrupt request to the lowest priority thread of the multithreaded processor based on the plurality of IRCs and the plurality of LDRs.

5. The multithreaded multicore processor of claim 4, wherein the plurality of ICRs and the plurality of LDRs support a quantity of the plurality of threads greater than one of the following:
255 threads for a physical destination mode; and
60 threads for logical destination mode that uses a hierarchical cluster destination model.

6. The multithreaded multicore processor of claim 1, wherein each of the plurality of core APICs is configured to:
identify a current lowest priority thread of the plurality of threads;
detect a reduced priority level of the current lowest priority thread;
update a current lowest priority thread register to the reduced priority level; and
set a core priority to the reduced priority level.

7. The multithreaded multicore processor of claim 1, wherein each of the plurality of care APICs is configured to:
identify a current lowest priority thread of the plurality of threads;
detect an increased priority level of the current lowest priority thread;
set a core priority to a maximum level;
determine a new lowest priority thread of the plurality of threads, wherein the new lowest priority thread has a new lowest priority level of the plurality of threads;
set the new lowest priority thread as the current lowest priority thread with the new lowest priority level; and
set a core priority to the new lowest priority level.

8. The multithreaded multicore processor of claim 1, wherein each of the plurality of core APICs is configured to:
identify a current lowest priority thread of the plurality of threads;
detect a reduced priority level of one of the plurality of threads other than the current lowest priority thread, wherein the reduced priority level is lower than a priority level of the current lowest priority thread;
set the one of the plurality of threads with the reduced priority level to be the current lowest priority thread; and
set a core priority to the reduced priority level.

9. The multithreaded multicore processor of claim 1, wherein each of the plurality of core APICs is configured to notify the I/O APIC of a change in a core priority at the time of the change in the core priority, wherein the core priority is a priority level of a lowest priority thread of a corresponding one of the plurality of multithreaded processors.

10. The multithreaded multicore processor of claim 1, wherein each of the plurality of core APICs is configured to notify the I/O APIC of a change in a core priority upon a request from the I/O APIC, wherein the core priority is a priority level of a lowest priority thread of a corresponding one of the plurality of multithreaded processors.

11. A core advanced programmable interrupt controller (core APIC) comprising:
a plurality of registers, each register identifying one of a plurality of threads of one of a plurality of multithreaded processors and each register storing a priority level of the one of the plurality of threads;
a processor interface configured to communicate with the one of the plurality of multithreaded processors;
a bus interface configured to communicate with a communication bus for communication with an input/output APIC (I/O APIC) that communicates with a plurality of other core APICs; and
a core APIC wherein the core APIC includes a plurality of interrupt command registers (IRCs), each of the plurality of IRCs dedicated to one of the threads of the plurality of threads of one of the multithreaded processors, a plurality of logical destination registers (LDRs), each of the plurality of LDRs dedicated to one of the threads of the plurality of threads associated with one of the threads of one of the multithreaded processors, the core APIC coupled to the processor interface, to the bus interface, and to each of the plurality of registers, wherein the core APIC controller is configured to:
determine a current lowest priority thread of the plurality of threads;
receive an interrupt request via the bus interface; and
route the interrupt request to the current lowest priority thread.

12. The core APIC of claim 11, wherein the core APIC is further configured to determine a core priority as a priority level of the current lowest priority thread.

13. The core APIC of claim 11, wherein the core APIC is further configured to:
detect a reduced priority level of the current lowest priority thread;
update a current lowest priority thread register to the reduced priority level; and
set a core priority to the reduced priority level.

14. The core APIC of claim 11, wherein the core APIC is further configured to:
detect one of the following:
a reduced priority level of one of the plurality of threads other than the current lowest priority thread, wherein the reduced priority level is lower than a priority level of the current lowest priority thread, and
activation of the one of the plurality of threads;
set the one of the plurality of threads with the reduced priority level to be the current lowest priority thread; and
set a core priority to the reduced priority level.

15. The core APIC of claim 11, wherein the core APIC is further configured to notify the I/O APIC of a change in a lowest priority value of the current lowest priority thread, wherein the core APIC notifies the I/O APIC at the time of the change in the lowest priority value.

16. The core APIC of claim 11, wherein the core APIC is further configured to notify the I/O APIC of a change in a lowest priority value of the current lowest priority thread, wherein the core APIC notifies the I/O APIC upon a request from the I/O APIC.

17. A computing system comprising:
a peripheral device;
a memory;
an input/output advanced programmable interrupt controller (I/O APIC); and a multithreaded multicore processor coupled to the peripheral device, to the memory, and to the I/O APIC, the multithreaded multicore processor including a plurality of processor cores, each comprising:
one of a plurality of multithreaded processors configured to execute a plurality of threads; and one of a plurality of core APICs wherein each core APIC includes a plurality of interrupt command registers (IRCs), each of the plurality of IRCs corresponding to one of the threads of the plurality of threads of the multithreaded processor and a plurality of logical destination registers (LDRs), each of the plurality of LDRs corresponding to one of the threads of the plurality of threads of the multithreaded processor, the one of a plurality of core APICs coupled to the one of the plurality of multithreaded processors and to the I/O APIC, and configured to receive an interrupt request and to route the interrupt request to a lowest priority thread of the one of the plurality of multithreaded processors.

18. The computing system of claim 17, wherein the I/O APIC is configured to:
receive a core priority from each of the plurality of core APICs; and
route the interrupt request to a lowest priority core APIC of the plurality of core APICS, wherein the lowest priority core APIC has a lowest core priority corresponding to the lowest priority thread.

19. The computing system of claim 17, wherein each of the plurality of core APICs is configured to notify the I/O APIC of a change in a core priority, wherein the core priority is a priority level of a lowest priority thread of a corresponding one of the plurality of multithreaded processors, and wherein a quantity of the plurality of threads is greater than one of the following:
255 threads when the computing system operates in a physical destination mode; and
60 threads when the computing system operates in logical destination mode that uses a hierarchical cluster destination model.

20. The computing system of claim 17, further comprising:
a second I/O APIC coupled to the multithreaded multicore processor, and configured to manage the priority levels, of a portion of the plurality of processor cores; and
a hierarchically higher level I/O APIC coupled to the I/O APIC and to the second I/O APIC, and configured to determine a lowest priority I/O APIC.

21. A core advanced programmable interrupt controller (core APIC) comprising:
a plurality of registers, each register identifying one of a plurality of threads of one of a plurality of multithreaded processors and each register storing a priority level of the one of the plurality of threads;
a processor interface configured to communicate with the one of the plurality of multithreaded processors;
a bus interface configured to communicate with a communication bus for communication with an input/output APIC (I/O APIC) that communicates with a plurality of other core APICs; and
a core APIC wherein the core APIC includes a plurality of interrupt command registers (IRCs), each associated with one of the threads of one of the multithreaded processors, a plurality of logical destination registers (LDRs), each associated with one of the threads associated with one of the threads of one of the multithreaded processors, the core APIC coupled to the processor interface, to the bus interface, and to each of the plurality of registers, wherein the core APIC is configured to:
determine a current lowest priority thread of the plurality of threads;
receive an interrupt request via the bus interface;
route the interrupt request to the current lowest priority thread; and
detect one of the following:
an increased priority level of the current lowest priority thread;
and a deactivation of the currently lowest priority thread;
set a core priority to a maximum level;
determine a new lowest priority thread of the plurality of threads, wherein the new lowest priority thread has a new lowest priority level of the plurality of threads;
set the new lowest priority thread as the current lowest priority thread with the new lowest priority level; and
set a core priority to the new lowest priority level.

* * * * *